June 7, 1960 — E. H. HARTEL — 2,939,655
LANDING GEAR RETRACTION SYSTEM
Filed Oct. 15, 1956 — 4 Sheets-Sheet 3
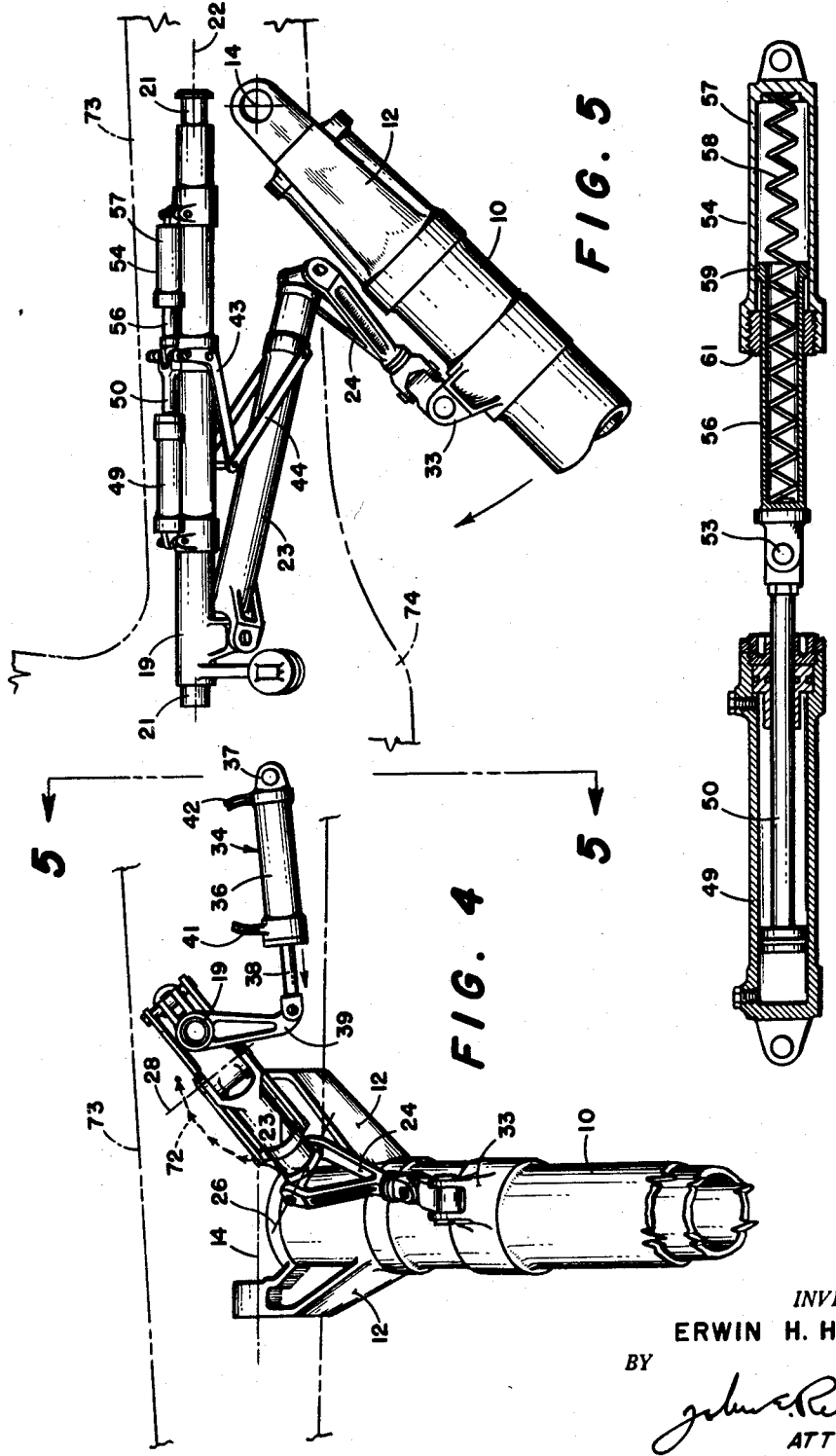
INVENTOR.
ERWIN H. HARTEL
BY
ATTORNEY June 7, 1960     E. H. HARTEL     2,939,655
LANDING GEAR RETRACTION SYSTEM
Filed Oct. 15, 1956     4 Sheets-Sheet 4
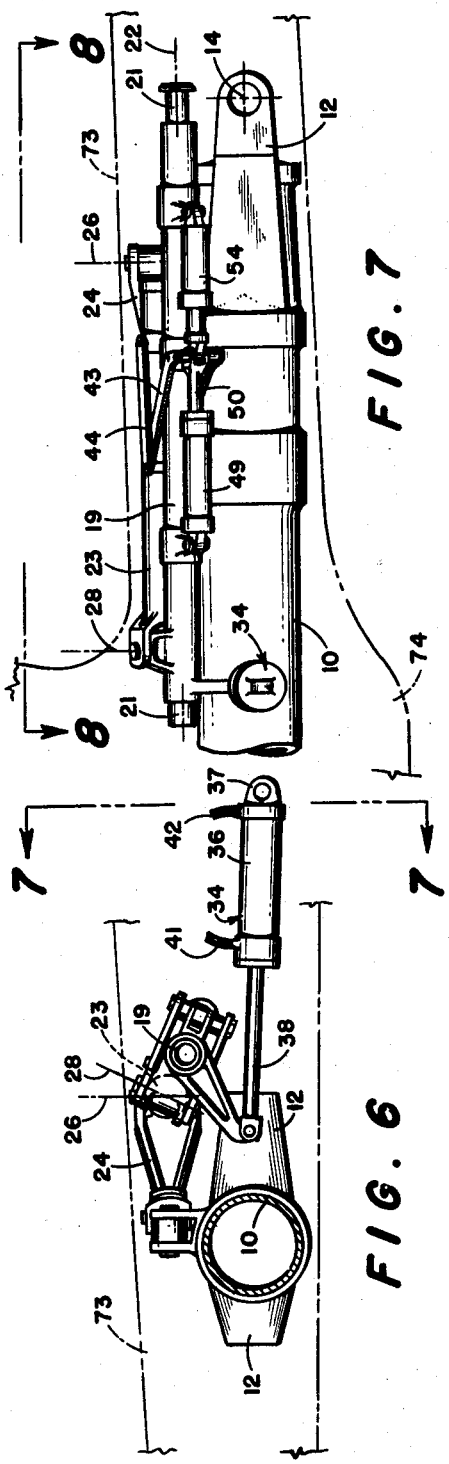
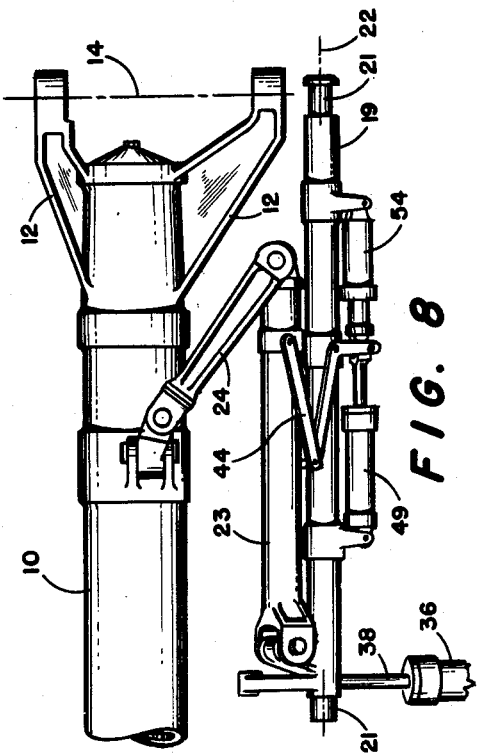
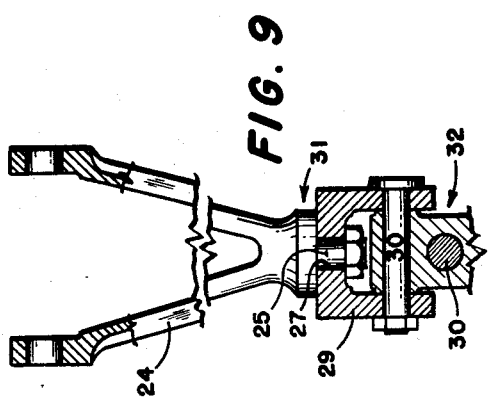
INVENTOR.
ERWIN H. HARTEL
BY
ATTORNEY United States Patent Office 2,939,655
Patented June 7, 1960

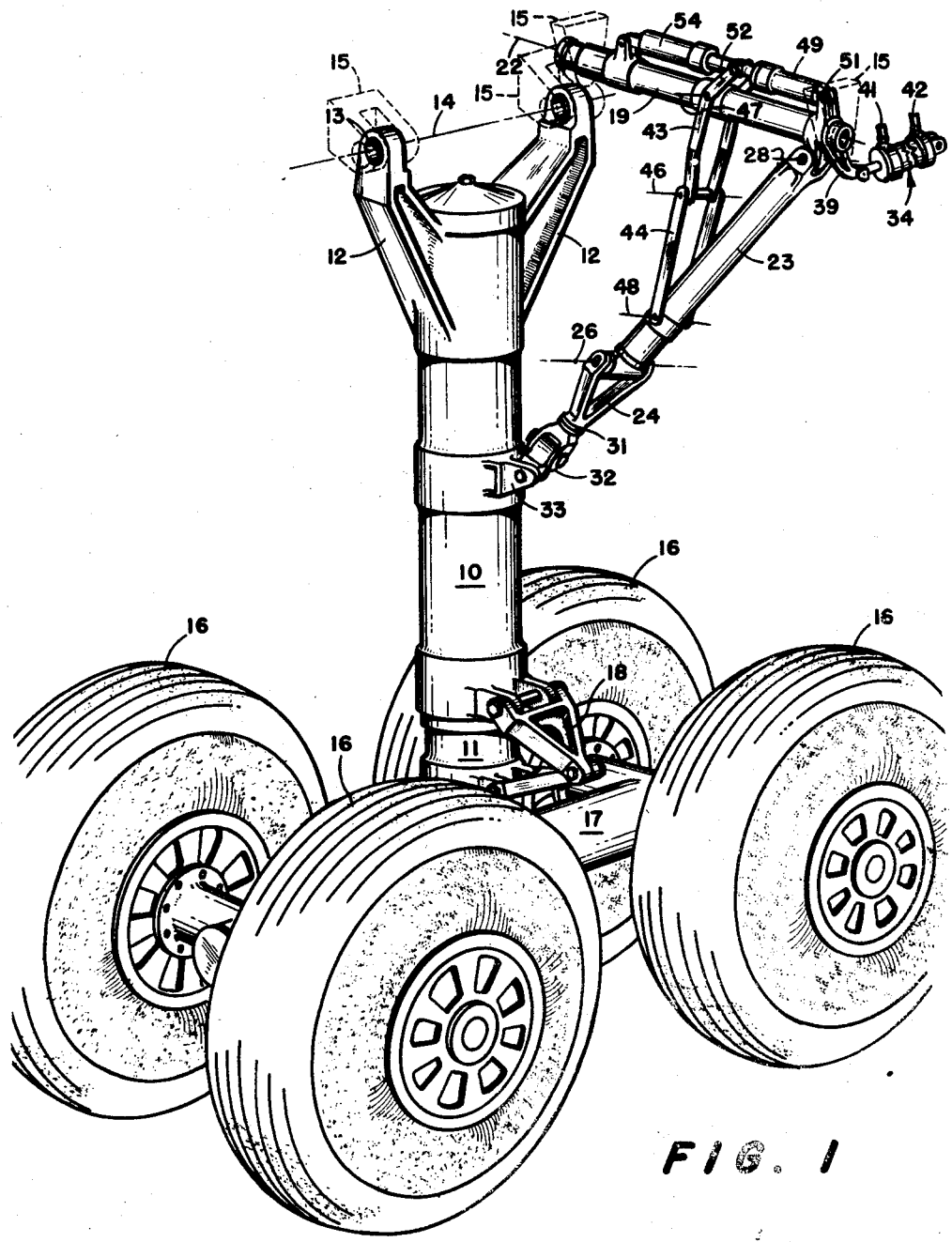

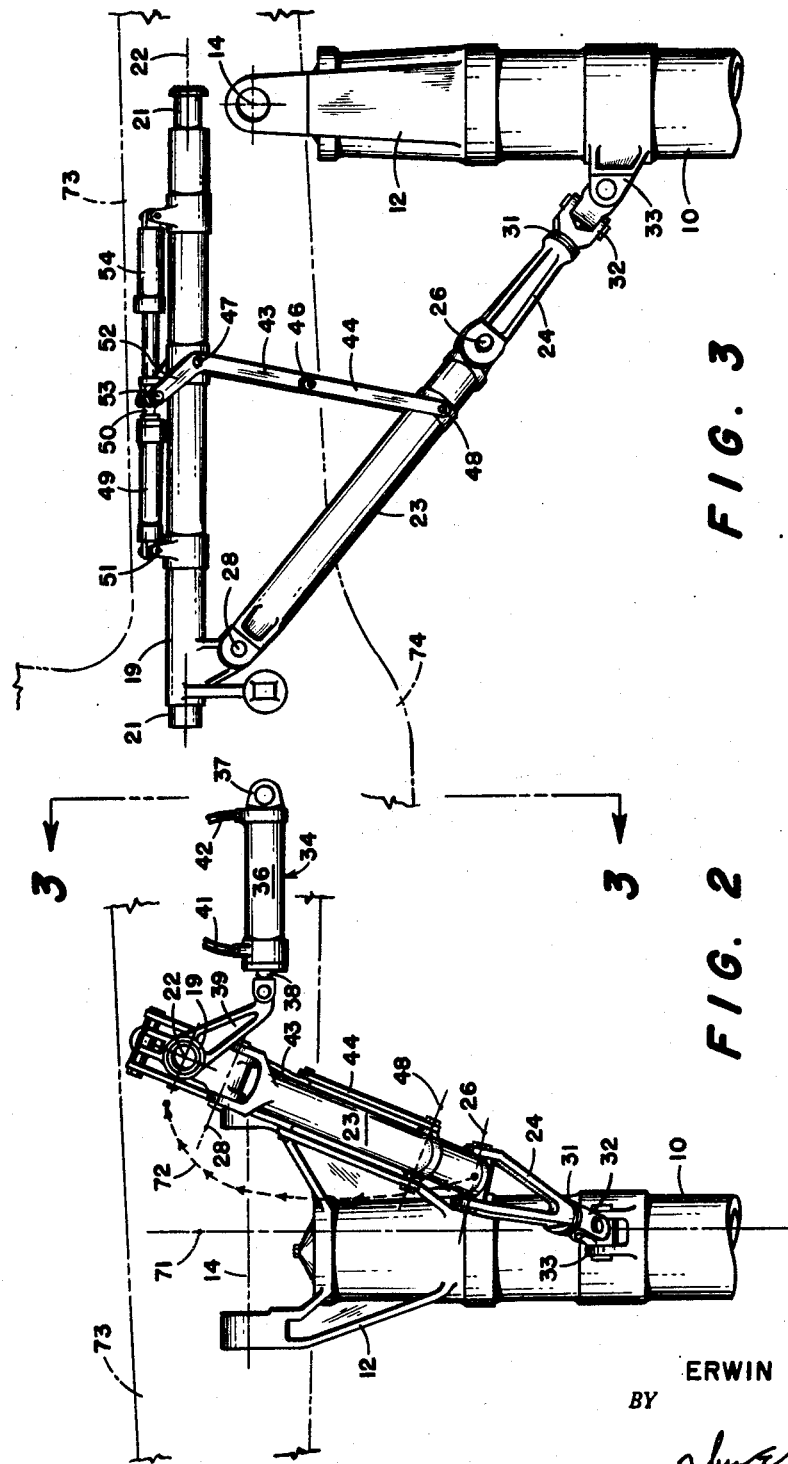

2,939,655

LANDING GEAR RETRACTION SYSTEM

Erwin H. Hartel, Cleveland, Ohio, assignor to Cleveland Pneumatic Industries, Inc., Cleveland, Ohio, a corporation of Ohio Filed Oct. 15, 1956, Ser. No. 616,065

12 Claims. (Cl. 244—102)

This invention relates generally to landing gears and more particularly to a new and improved retract system for aircraft landing gears.

It is an important object of this invention to provide a new and improved landing gear retract system which fits into a small space envelope when retracted.

It is another important object of this invention to provide a retract system having novel means for applying the retraction force to the landing gear.

It is another object of this invention to provide a landing gear retraction system having folding drag links wherein the drag links are provided with two non-parallel pivotal connections enabling retraction by the use of a torque force in a plane containing one of the pivotal connections.

It is still another object of this invention to provide a landing gear retraction system wherein a retraction force is applied to folding drag links and is capable of producing retraction of the landing gear to a fully retracted position at which time the drag links are substantially within a horizontal plane parallel to the axis of the landing gear.

Further objects and advantages will appear from the following description and drawings, wherein:

Figure 1 is a perspective view showing a preferred landing gear according to this invention;

Figure 2 is a fragmentary side elevation of the preferred landing gear in the fully extended position;

Figure 3 is a side elevation taken along 3—3 of Figure 2;

Figures 4 and 5 are views similar to Figures 2 and 3 respectively showing the position of the elements at an intermediate position when the landing gear is partially retracted;

Figure 6 is a side elevation showing the position the elements assume in the fully retracted position;

Figure 7 is an elevation taken along 7—7 of Figure 6;

Figure 8 is a plan view taken along 8—8 of Figure 7;

Figure 9 is a fragmentary view partially in section showing the swivel connection between the lower drag link and the strut; and, Figure 10 is a fragmentary view in longitudinal section of the locking mechanism actuator and spring.

In most modern retractable landing gears, the main strut includes an upper telescoping member pivotally mounted on the frame of an aircraft and a lower telescoping member on which ground engaging wheels are mounted. Means must be provided to rotate the main strut around its pivot to retract the gear into the aircraft itself when the aircraft is airborne. In the past, it has been customary to retract the landing gear into the wing of the aircraft, however, this has become increasingly more difficult since the wing thickness has decreased as the speed of the aircraft has increased, making it essentially impossible to store the entire landing gear and wheels within the wing structure. This situation is also complicated by the fact that the advent of turbine engines has eliminated the previously existing storage area behind the older type engine in which the wheels were normally stored. In the preferred embodiment of this invention, a structure is shown wherein a main landing gear is adapted to be mounted on the wing of the aircraft and upon retraction, the strut proper is stored within the wing while the wheels are stored within the fuselage. Because the wing structure is relatively thin, it is necessary to provide a retraction system which folds to provide a very thin envelope along the strut so that the strut and retraction mechanism can be stored completely within the wing.

Referring to the drawings, a preferred embodiment of this invention includes a strut comprising an upper telescoping member 10 and a lower telescoping member 11 which are axially movable relative to each other. The upper telescoping member 10 is formed with a mounting yoke 12 having mounting bores 13, which receive pivots carried by the body or frame of the aircraft 15 schematically shown. Therefore, the upper telescoping member 10 is pivotally mounted on the frame of an aircraft 15 for motion around the pivot axis 14 which is in a horizontal plane. One or more ground engaging wheels 16 are carried by the lower telescoping member 11. In the illustrated embodiment, an axle beam 17 is mounted on the lower telescoping member 11 and the wheels 16 are mounted on the axle beam 17 in a dual tandem arrangement. Conventional torque arms 18 are connected between the upper and lower telescoping members 10 and 11 to prevent relative rotation therebetween while permitting relative axial motion. The two telescoping members co-operate to form a fluid spring which resiliently urges the lower telescoping member 11 downwardly relative to the upper telescoping member 10, and thereby resiliently supports the weight of the aircraft when it is on the ground. The fluid spring structure forms no part of this invention so it has not been shown.

A mounting or torque tube 19 is formed with end bearing surfaces 21 which are journaled on the frame of the aircraft 15 so that the torque tube can rotate relative to the aircraft around a pivot axis 22. In order to supply lateral support to the upper telescoping member 10, and provide for retraction, I utilize a pair of drag links 23 and 24 which are pivoted together for relative rotation around a pivot axis 26. The drag link 23 is connected to the torque tube 19 by a pivot pin for rotation relative thereto around a pivot axis 28. The drag link 24 is connected to the upper telescoping member 10 through a swivel connection at 31 and a universal joint 32 which is in turn mounted on lugs 33 formed on the upper telescoping member 10. The use of a swivel joint 31 in combination with a universal joint 32 provides a connection between the drag link 24 and the upper telescoping member 10 which permits relative rotational movement in all directions between these two members. To provide the swivel structure, I prefer to provide the drag link 24 with a projection 25 (see Figure 9) which extends through a bore 27 formed in a shackle 29 which is in turn pivotally connected to the universal joint 32. The universal joint 32 has the conventional two pivot pins 30 in perpendicular planes and the swivel joint 31 has a pivot in a third plane so complete freedom of rotation is possible between the drag link 24 and the upper telescoping member 10.

Two fluid actuators of the piston and cylinder type are utilized to operate the retraction system. To provide retraction power, I use a fluid actuator 34 having a cylinder 36 pivotally mounted on the frame of the aircraft by means of a pin through mounting lugs 37 formed on the cylinder and co-operating piston 38 which is pivotally connected to a depending arm 39 formed on the torque tube 19. Fluid under pressure applied to the cylinder 36 through either of the pressure hoses 41 or 42 causes relative axial motion between the piston 38 and the cylinder 36 which causes the torque tube 19 to rotate about its axis 22. Such rotation causes retraction of the landing gear or extension as the case may be and as hereinafter discussed.

In order to lock the landing gear in the extended position shown in Figures 1 through 3, I provide two pairs of lock arms 43 and 44 which pairs are pivotally connected together for relative rotation around a pivot axis 46. The lock arms 43 are mounted in straddle relation with respect to the torque tube 19 and are pivotally connected to the tube for rotation relative thereto around a pivot axis 47 which is parallel to the pivot axes 28 and 46. The lock arms 44 also straddles the drag link 23 and are pivotally connected thereto for relative rotation around a pivot axis 48 which is parallel to the pivot axes 28, 46 and 47. To operate the lock arms 43 and 44, I provide a fluid actuator having a cylinder 49 pivotally connected to the torque tube 19 at 51, and a piston 50 pivotally connected at 53 to a projection 52, which projection is formed on each arm 43 and extends angularly from the axis 47 beyond the torque tube 19. Fluid under pressure supplied to this fluid actuator produces relative axial motion between the piston 50 and the cylinder 49 and causes pivotal movement of the lock arms 43 relative to the torque tube 19. When the lock arms 43 and 44 are in the locked position, the axis 46 is contained in a plane containing the pivot axes 47 and 48. At this time, the drag link 23 is locked against rotation relative to the torque tube 19 around the pivot axis 28, thereby resulting in a rigid structure. In order to maintain the lock arms 43 and 44 in the locked position, I prefer to provide a spring device at 54 which is pivotally connected to the torque tube 19 and to the projections 52 at 53. The structure of the spring device 54 and of the cylinder 49 and piston 50 is shown in Figure 10. The spring device includes a pair of telescoping housings 56 and 57 which are axially movable relative to each other and which house a compression spring 58. The spring 58 urges the housing 56 to the left toward the position wherein a stop 59 on the housing 56 moves into engagement with a bearing 61 threaded into the housing 57. The various elements should be proportioned so that the lock arms 43 and 44 are aligned when the stop 59 engages the bearing 61 so that the lock arms will be held in the lock position.

An inspection of Figures 2 and 3 will show that the axis of the torque tube 19 is laterally spaced from the plane of movement of the connection between the drag link 24 and the upper telescoping member 10, which plane is perpendicular to the axis 14 and appears on edge in Figure 2 as shown by line 71. In the embodiment shown, the axis 22 is parallel to the plane shown at 71 and the drag links 23 and 24 are proportioned so that they are axially aligned when the upper telescoping member 10 is in the extended position. Therefore, the drag links 23 and 24 are capable of resisting compressive forces along their axis as well as extension forces without producing undue stress in the lock arms 43 and 44. When the drag links are in this position, the upper telescoping member 10 is rigidly locked in the extended position and is able to withstand the impacts of landing and the like.

When it is desired to retract the landing gear from the position shown in Figures 2 and 3, fluid under pressure is supplied to the fluid actuator 34 in a manner which causes the piston 38 to extend and rotate the torque tube 19 in a clockwise direction. At the same time, fluid under pressure is supplied to the cylinder 49 which causes the piston 50 to overcome the action of the spring 58 and unlock the lock arms 43 and 44. As soon as the lock arms 43 and 44 have moved to the point where the axis 46 is to the left of a plane through the axes 47 and 48, as seen in Figure 3, the drag links 23 and 24 are able to fold around the respective pivots.

In the preferred embodiment, the axis 28 of the pin connecting the drag link 23 to the torque tube 19 is perpendicular to a plane containing the central axis of the drag link 23 and the axis 22. However, the axis 26 of the connection between the two drag links 23 and 24 should be inclined relative to this plane so that forces are produced tending to cause folding of the drag links. Because the two axes 26 and 28 are not parallel, rotational movement of the torque tube 19 and in turn the drag link 23 around the torque tube axis 22 causes the effective center of the axis 26 to move along a path or locus shown by the dotted arrowed line 72. Those skilled in the art will recognize that the only force moments which can be transmitted through the pivotal connection between the drag link 23 and the torque tube 19 are force moments operating in a plane containing the axis 28. By the same token, the only force that can be transmitted between the two drag links 23 and 24 are force moments in a plane containing the axis 26. Since the axes 26 and 28 are not parallel, a force moment applied by the actuator 34 tending to rotate the torque tube 19 produces a resulting force along the line 72 in the connection between the two drag links. This force causes the drag links to fold up along the line 72 toward the retracted position.

In Figures 4 and 5, the elements are shown in a midposition through which they pass when they operate between the extended and retracted position. An inspection of these figures when compared to Figures 2 and 3 will show that the upper telescoping member 10 has rotated from the vertical position to a half retracted position, while the torque tube 19 has rotated under the influence of the actuator. The drag links 23 and 24 have already folded to a large extent and the lock arms 43 and 44 have moved toward the folded position. As the torque tube 19 continues to rotate in a clockwise direction, the elements move to the fully retracted position shown in Figures 6 through 8. At this time, the axis of the upper telescoping member 10 is substantially parallel to the axis 22 of the torque tube 19 and the drag links 23 and 24 are folded to the position best shown in Figures 6 and 8. It should be noted that the entire retraction mechanism folds into an envelope having a width only slightly greater than the width of the upper telescoping member 10, and that the entire mechanism is enclosed within the wing shown in phantom at 73. Figure 7 shows that the upper telescoping member 10 is enclosed within the wing 73 and that the wheels at the end of the strut would be enclosed within the fuselage shown in phantom at 74.

The structure disclosed has numerous advantages other than the advantage of storage within a narrow area. Because the retraction actuator operates to apply torque to the torque tube 19, the retracting force on the landing gear continues to be relatively large when the elements approach the fully retracted position. Those skilled in the art will recognize that the forces necessary to retract the landing gear increase rapidly as the landing gear approaches the horizontal position. In the disclosed structure, the torque efficiency of the retraction system does not drop off as the landing gear approaches the fully retracted position, but rather maintains itself at a high level so that a relatively small actuator 34 can be used to accomplish the entire retraction of the system. This mechanism does have a relative low torque efficiency when the landing gear is in the fully extended position of Figures 2 and 3, however, at this time, a relatively small amount of torque is necessary to cause rotation of the upper telescoping member around the axis 14 because the elements are closed in the vertical position. By utilizing a drag link structure wherein the axes 28 and 26 are not parallel, I am able to produce a force which causes the initial folding of the drag links 23 and 24. If the two axes 28 and 26 were parallel, there would be a resulting force tending to cause the drag links 23 and 24 to be compressed. However, since the two drag links are in alignment at this time, such arrangement in itself would not be dependable to cause the initial folding of the drag links. It may be desirable, however, to use such a structure, and if such is the case, the initial folding can be created by the lock arms 43 and 44 as they are moved to an unlocked position by the locking actuator 54. In the embodiment shown, the locking actuator through its folding of the lock arms 43 and 44 assists in the initial folding of the drag links 23 and 24 so that sufficient torque is present to start the retraction of the landing gear even though the axes 26 and 28 are out of parallel by a relatively small amount. If other means are used to lock the landing gear in the extended position, and a greater torque is necessary to cause the initial retraction, it is merely necessary to use a larger angle between the axis 26 and the plane perpendicular to the axis 28 because the initial torque of the system is a function of the size of this angle. In a system of the type shown, the torque efficiency increases as a plane through the axis 22 and the connection between the drag link 24 and upper telescoping member 10 approaches a perpendicular position relative to the vertical plane containing the connection. Therefore, the torque efficiency of the system approaches a maximum when the strut approaches the retracted position. This is desirable since the retraction load increases as the upper telescoping member 10 moves toward the retracted position and maximum torque is available when maximum load is present.

In the illustrated embodiment, the axis 22 of the torque tube 19 is parallel to the plane of movement of the connection between the drag link 24 and the upper telescoping member 10. This structure is a particular case of the broad structure and such a relationship need not exist in all cases. Retracting torque will be provided even if the axis 22 intersects the plane of the connection between the drag link 24 and the upper telescoping member 10.

Although the structure shown is very simple and easy to fabricate and maintain, the resulting retraction system will produce adequate force to retract the landing gear without the use of excessive actuator forces because the system has a relatively high efficiency when the retract loads are high. Again, since the two axes 28 and 26 are not parallel, retracting torque will be available in the fully extended position as well as through the remaining portions of the retraction movement. Therefore, it is possible to use the simple actuator 34, which actuator does not have to be excessively powerful, to provide the power for full retraction of the landing gear.

Although the preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed descriptions are determinative of the scope of the invention.

I claim:

1. A retractable landing gear system for aircraft comprising a body, a landing wheel carrying strut mounted on said body for rotation relative thereto around an axis between an extended and a retracted position, a pair of elongated drag links connected between said strut and body proportioned so that their axes are aligned with each other and inclined relative to said strut when the latter is in said extended position, a pivotal connection between said links permitting relative rotation therebetween around an axis, and force means operably connected to at least one of said links producing a force moment in a plane containing the axis of the pivot connecting said links for effecting rotation of said strut.

2. A retractable landing gear for aircraft comprising a body, a landing wheel carrying strut mounted on said body for rotation relative thereto around an axis between a substantially vertical extended position and a substantially horizontal retracted position, a pair of elongated drag links connected between said strut and aircraft proportioned so that their axes are aligned with each other and inclined relative to a vertical plane containing said first axis when said strut is in said extended position, a pivotal connection between said links permitting relative rotation therebetween around an axis, and force means operably connected to at least one of said links producing a force moment in a plane containing the axis of the pivot connecting said links for effecting rotation of said strut.

3. A retractable landing gear for aircraft comprising a body, a landing wheel carrying strut member pivotally mounted on said body for rotational movement relative thereto, a mounting member on said body, a pair of link members between said mounting and strut members, a pivotal connection between said mounting member and one of said link members at a point spaced from said strut member, a pivotal connection between said link members, a pivotal connection between said strut member and the other of said link members at a point spaced from said mounting member, one of said pivotal connections enabling relative rotation between its associated members about an axis, and an actuator operably connected to said link members operable to move said one pivotal connection relative to said body about an axis non-parallel relative to the axis of said one connection thereby causing said strut member to rotate relative to the body.

4. A retractable landing gear for aircraft comprising a body, a landing wheel carrying strut member pivotally mounted on said body for rotational movement relative thereto, a mounting member on said body, a pair of link members between said mounting and strut members, a pivotal connection between said mounting member and one of said link members at a point spaced from said strut member, a pivotal connection between said link members, a pivotal connection between said strut member and the other of said link members at a point spaced from said mounting member, two of said connections enabling relative rotation between their associated members about pivot axes, the other connection permitting swivel motion between its associated members, and an actuator operably connected to said link members operable to move said pivot axes relative to said body about an axis of rotation non-parallel to said pivot axes causing said strut member to rotate relative to the body.

5. A retractable landing gear for aircraft comprising a body, a landing wheel carrying strut member pivotally mounted on said body for rotational movement relative thereto, a mounting member on said body, a pair of link members between said mounting and strut members, a pivotal connection between said mounting member and one of said link members at a point spaced from said strut member, a pivotal connection between said link members, a pivotal connection between said strut member and the other of said link members at a point spaced from said mounting member, two of said pivotal connections enabling relative rotation between their associated members about pivot axes which are non-parallel relative to each other, the other pivotal connection permitting swivel motion between its associated members, and an actuator operably connected to said link members operable to move one of said pivot axes relative to said body around an axis non-parallel relative to said one pivot axis thereby causing said strut member to rotate relative to the body.

6. A landing gear retraction system comprising a body, a strut pivotally mounted on said body for rotational movement relative thereto around an axis, a torque member mounted on said body for rotation relative thereto around an axis, a pair of elongated links between said torque member and strut, a pivotal connection between one of said links and said torque member permitting relative rotation therebetween around an axis intersecting a plane containing the axis of rotation of said torque member and the central axis of said one link, a pivotal connection between said links permitting relative rotation therebetween around an axis intersecting said plane, a swivel connection between said strut and the other of said links permitting relative rotation therebetween in all directions, and an actuator connected to said torque member operable to produce rotation of said torque member about the axis of rotation of said torque member thereby producing rotation of said strut around said first axis.

7. A landing gear retraction system comprising a body, a strut pivotally mounted on said body for rotational movement relative thereto around an axis, a torque member mounted on said body for rotation relative thereto around an axis, a pair of elongated links between said torque member and strut, a pivotal connection between one of said links and said torque member permitting relative rotation therebetween around an axis perpendicularly intersecting a plane containing the axis of rotation of said torque member and the central axis of said one link, a pivotal connection between said links permitting relative rotation therebetween around an axis inclined relative to said plane, a swivel connection between said strut and the other of said links permitting relative rotation therebetween in all directions, and an actuator connected to said torque member operable to produce rotation of said torque member about its axis of rotation thereby producing rotation of said strut around said first axis.

8. A landing gear retraction system comprising an aircraft, a strut pivotally mounted on said aircraft for rotational movement relative thereto around an axis, a torque member mounted on said aircraft for rotation relative thereto around an axis, a pair of elongated links, a pivotal connection between one of said links and said torque member permitting relative rotation therebetween around an axis intersecting a plane containing the axis of rotation of said torque member and the central axis of said one link, a pivotal connection between said links permitting relative therebetween around an axis intersecting said plane and non-parallel relative to the axis of the pivot connecting said one link and said torque member, a swivel connection between said strut and the other of said links permitting relative rotation therebetween in all directions, and an actuator connected to said torque member operable to produce rotation of said torque member about its axis of rotation thereby producing rotation of said strut.

9. A landing gear retraction system comprising an aircraft, a strut mounted on said aircraft for rotation relative thereto around an axis between an extended and a retracted position, a pair of elongated drag links connected between said strut and aircraft proportioned so that their axes are aligned with each other and inclined relative to said strut when the latter is in said extended position, a pivotal connection between said links permitting relative rotation therebetween around an axis, lock means normally maintaining said drag links aligned operable to produce movement therebetween around the axis of the pivotal connection between said links, and force means producing a force moment in a plane containing the axis of said pivotal connection between said links thereby effecting rotation of said strut.

10. A landing gear retraction system comprising an aircraft, a strut pivotally mounted on said aircraft for rotational movement relative thereto around an axis between an extended and a retracted position, a torque member mounted on said aircraft for rotation relative thereto around an axis, a pair of elongated links, a pivotal connection between one of said links and said torque member permitting relative rotation therebetween around an axis perpendicularly intersecting a plane containing the axis of rotation of said torque member and the central axis of said one link, a pivotal connection between said links permitting relative rotation therebetween around an axis inclined relative to said plane, a swivel connection between said strut and the other of said members permitting relative rotation therebetween in all directions, said links being in alignment when said strut is in said extended position, lock means normally maintaining said links in alignment operable to assist in producing movement between said links away from said aligned position, and an actuator connected to said torque member operable to produce rotation of said torque member about the axis of rotation of said torque member thereby producing rotation of said strut.

11. A retractable landing gear system for aircraft comprising a body element, a landing wheel carrying strut element mounted on said body for rotation relative thereto about an axis between an extended and a retracted position, a pair of co-operating drag members, a connection between said body element and one of said members, a connection between said strut element and the other of said members, one of said connections providing relative motion between its associated element and member only around a pivot axis, force means producing a force moment in a plane containing said pivot axis, a third connection between said members permitting relative movement between said members changing the distance between said first and second connections and preventing relative rotation between said members in said plane whereby said force moment produces rotation of said strut element.

12. A retractable landing gear for an aircraft comprising a body, a landing wheel carrying strut member pivotally connected on said body for rotational movement relative thereto about an axis, a mounting member in said body rotatable relative thereto about an axis, non-parallel to the pivotal axis of said strut member, a pair of link members between said mounting member and strut member, a pivot connecting said mounting member and one of said link members at a point spaced from said strut member, a pivot connecting said link members, a pivot connecting said strut member and the other of said link member at a point spaced from said mounting member, at least one of said pivot connections permitting relative rotation between its associated members about an axis non-parallel relative to the other of said axes; and an actuator operably connected to said strut operable to produce rotation of said strut member about the axis of rotation of said strut member, relative rotation between the members associated with said one pivotal connection about the axis of said one pivotal connection, and rotation of said mounting member about the axis of rotation of said mounting member.

References Cited in the file of this patent
UNITED STATES PATENTS

| | | |
|---|---|---|
| 2,280,185 | Bridges | Apr. 21, 1942 |
| 2,437,135 | Steinhoff | Mar. 2, 1948 |
| 2,487,548 | Hawkins | Nov. 8, 1949 |
| 2,497,489 | Coursen et al. | Feb. 14, 1950 |
| 2,777,652 | Grudin | Jan. 15, 1957 |